US007809465B2

(12) United States Patent
Yamaguchi et al.

(10) Patent No.: US 7,809,465 B2
(45) Date of Patent: Oct. 5, 2010

(54) DEVICE, METHOD AND PROGRAM FOR SOLDERING

(75) Inventors: Takahito Yamaguchi, Saitama (JP); Kiyoshi Dohzono, Saitama (JP)

(73) Assignees: Tamura Corporation, Tokyo (JP); Tamura Fa System Corporation, Saitama (JP)

(*) Notice: Subject to any disclaimer, the term of this patent is extended or adjusted under 35 U.S.C. 154(b) by 239 days.

(21) Appl. No.: 11/950,106

(22) Filed: Dec. 4, 2007

(65) Prior Publication Data
US 2008/0177412 A1 Jul. 24, 2008

(30) Foreign Application Priority Data
Jan. 23, 2007 (JP) ............... 2007-012896

(51) Int. Cl.
G06F 19/00 (2006.01)
D06F 75/24 (2006.01)
F27D 11/00 (2006.01)
F27B 14/00 (2006.01)

(52) U.S. Cl. ............... 700/212; 700/114; 700/207; 700/210; 700/299; 219/255; 219/388; 219/422; 218/8

(58) Field of Classification Search ............... 700/212, 700/114, 207, 210, 299; 228/8; 219/255, 219/388, 422
See application file for complete search history.

(56) References Cited

U.S. PATENT DOCUMENTS

| 6,018,144 | A | * | 1/2000 | Vogt et al. | 219/388 |
| 6,135,344 | A | * | 10/2000 | Sakuyama et al. | 228/234.1 |
| 6,345,757 | B1 | * | 2/2002 | Sakuyama et al. | 228/102 |
| 6,453,219 | B1 | * | 9/2002 | Kazmierowicz et al. | 700/299 |
| 6,560,514 | B1 | * | 5/2003 | Schultz et al. | 700/299 |
| 6,606,537 | B1 | * | 8/2003 | Kazmierowicz et al. | 700/210 |

(Continued)

FOREIGN PATENT DOCUMENTS

JP 1-147281 6/1989

(Continued)

OTHER PUBLICATIONS

Morimoto et al., An Apparatus for Specific Heat Capacity Measurement by Thermal Radiation Calorimetry, International Journal of Thermophsics, vol. 20, No. 2, 1999.*

(Continued)

*Primary Examiner*—Albert DeCady
*Assistant Examiner*—Darrin Dunn
(74) *Attorney, Agent, or Firm*—Greenblum & Bernstein, P.L.C.

(57) ABSTRACT

Soldering can be performed in a state where the temperature in an object zone is stable, regardless of the heat capacity of a soldering object. A soldering device includes: a position calculation unit which calculates the position of a heated object according to operational information of a conveyer which sequentially transfers the heated object into a plurality of zones for heat processing communicated with each other; a heat capacity calculation unit which calculates the heat capacity of the heated object; and a temperature management unit which controls the temperature in an object zone into which the heated object is carried, upon receiving positional information from the position calculation unit. The temperature management unit feedforward-controls the temperature in the object zone by adjusting the heat capacity of the object zone according to the heat capacity calculated by the heat capacity calculation unit.

12 Claims, 6 Drawing Sheets

U.S. PATENT DOCUMENTS

| | | |
|---|---|---|
| 7,493,242 B1 * | 2/2009 | Garcia .......................... 703/2 |
| 2003/0020928 A1 * | 1/2003 | Ritzdorf et al. ............. 356/630 |
| 2005/0121495 A1 * | 6/2005 | Yokoyama .................... 228/9 |
| 2006/0054667 A1 | 3/2006 | Onozaki et al. |
| 2007/0158387 A1 | 7/2007 | Shirai et al. |
| 2007/0181218 A1 | 8/2007 | Sakamoto et al. |

FOREIGN PATENT DOCUMENTS

| | | |
|---|---|---|
| JP | 2000-277905 | 10/1990 |
| JP | 4-371365 | 12/1992 |
| JP | 9-74270 | 3/1997 |

OTHER PUBLICATIONS

English language Abstract of JP 1-147281.
English language Abstract of JP 4-371365.
English language Abstract of JP 9-74270.
English language Abstract of JP 2000-277905.

* cited by examiner

DEVICE, METHOD AND PROGRAM FOR SOLDERING

BACKGROUND OF THE INVENTION

1. Field of the Invention

The present invention relates to a device, a method, and a program for soldering a soldering object while transferring it into a plurality of zones for processing.

2. Related Art

A method of soldering a soldering object while transferring it into a plurality of zones for processing has been adopted. In order to perform this kind of soldering, it is necessary to detect the position of a substrate which is a soldering object and the temperature of the subject at the position, and to control the temperature to which the substrate is heated according to the detected information.

Japanese Patent Application Laid-Open No. 1-147281 (Patent Document 1) discloses art which is a so-called feedback control, in which a substrate arrival sensor detects that a substrate arrives at a predetermined position, a temperature sensor detects the temperature of the substrate which arrives at the predetermined position, and the substrate is heated by a heater in synchronization with the temperature sensor.

Japanese Patent Application Laid-Open No. 4-371365 (Patent Document 2) discloses art to control the temperature of a heater so as to achieve a desired temperature profile according to the initial temperature data of a substrate.

Japanese Patent Application Laid-Open No. 9-74270 (Patent Document 3) discloses art in which measurement of the temperature of a substrate is substantially started when the substrate is carried into a furnace, and according to signals from a pulse counter which operates in synchronization with the operating amount of the conveyer, the temperature of the substrate is measured by a temperature sensor according to the relationship with the substrate position in the furnace.

Japanese Patent Application Laid-Open No. 2000-277905 (Patent Document 4) discloses art to estimate an air flow in a furnace according to the positional information of a substrate to thereby control a gas flow.

In feedback-controlling the output amount of a heater corresponding to signals from a substrate temperature sensor, the temperature in a furnace drastically drops by the heat capacity of the substrate when the substrate is carried in. However, Patent Document 1 does not take into account that a substrate deprives a part of the heat quantity of the furnace if the temperature of the furnace is controlled after the temperature has drastically dropped, so the fluctuation of temperature in the furnace becomes large. Therefore, a component of low heat resistance mounted on the substrate may be broken due to the temperature fluctuation inside the furnace. Further, in Patent Document 1, the time to heat the furnace delays.

In Patent Document 2, a temperature control is performed in the same manner as that of Patent Document 1, but Patent Document 2 is different from Patent Document 1 in an aspect that the temperature of a heater is controlled so as to achieve a desired temperature profile according to the temperature data of the substrate.

However, as in the case of Patent Document 1, the temperature in a furnace when a substrate is carried into the furnace is not adjusted in Patent Document 2. Therefore, there is a limit in suppressing drastic fluctuation of the temperature in the furnace.

In the case of Patent Document 3, although it is possible to measure the temperature of a substrate according to the relationship with the substrate position inside the furnace corresponding to the signals from a pulse counter which are output in synchronization with the operation amount of the conveyer, a temperature control which also considers the heat capacity of the substrate calculated beforehand, together with the temperature in the furnace when the substrate is carried therein, cannot be performed.

In Patent Document 4, although the positional information of a substrate is calculated from installment of the substrate and the substrate conveying operation in the furnace, a temperature control which also considers the heat capacity of the substrate calculated beforehand, together with the temperature in the furnace when the substrate is carried therein, cannot be performed.

SUMMARY OF THE INVENTION

An object of the present invention is to provide a device, a method and a program for soldering, to perform a temperature control while taking into account the heat capacity of a soldering object carried into a furnace.

In order to achieve the object, a soldering device according to the present invention includes: a position calculation unit which calculates the position of a heated object according to operational information of a conveyer which sequentially transfers the heated object into a plurality of zones for heat processing communicated with each other; a heat capacity calculation unit which calculates the heat capacity of the heated object; and a temperature management unit which controls the temperature in an object zone into which the heated object is carried, upon receiving positional information from the position calculation unit.

The temperature management unit controls the temperature in the object zone by adjusting the heat capacity of the object zone, according to the heat capacity calculated by the heat capacity calculation unit.

In other words, the present invention performs a temperature control of an object zone by adjusting the heat capacity of the object zone according to the calculated heat capacity before performing a feedback control, that is, a so-called feedforward control, to thereby suppress abrupt changes in the temperature in the object zone.

Although the present invention is configured to be a soldering device as hardware in the above description, the present invention may be configured to be a soldering method. Further, the present invention may be configured to be a program for soldering as software, which drive-controls a computer provided to a soldering device so as to cause the computer to perform functions as a soldering device.

In the case that the present invention is configured to be a soldering method, the soldering method according to the present invention includes the steps of: calculating the position of a heated object according to operational information of a conveyer which sequentially transfers the heated object into a plurality of zones for heat processing communicated with each other; calculating the heat capacity of the heated object; and managing a temperature in an object zone into which the heated object is carried by controlling the temperature, upon receiving the calculated positional information of the heated object.

In the step of managing the temperature, the temperature of the object zone is controlled by adjusting the heat capacity of the object zone according to the calculated heat capacity.

Further, a program for soldering according to the present invention is configured to cause a computer provided to a soldering device to perform a function of calculating the position of a heated object according to operational information of a conveyer which sequentially transfers the heated object into a plurality of zones for heat processing communicated with each other; a function of calculating the heat capacity of the heated object; and a function of controlling the temperature in an object zone into which the heated object is carried by adjusting the heat capacity of the object zone based on the heat capacity of the soldering object calculated, upon receiving the calculated positional information of the heated object.

According to the present invention, the temperature of the object zone is controlled while taking into account the heat capacity of the heated object together with the initial temperature in the temperature control of the object zone where the heated object is processed with heat. This enables to improve the stability of the temperature in the object zone.

DESCRIPTION OF PREFERRED EMBODIMENT

Hereinafter, an embodiment of the present invention will be described according to the drawings.

Figure 1:
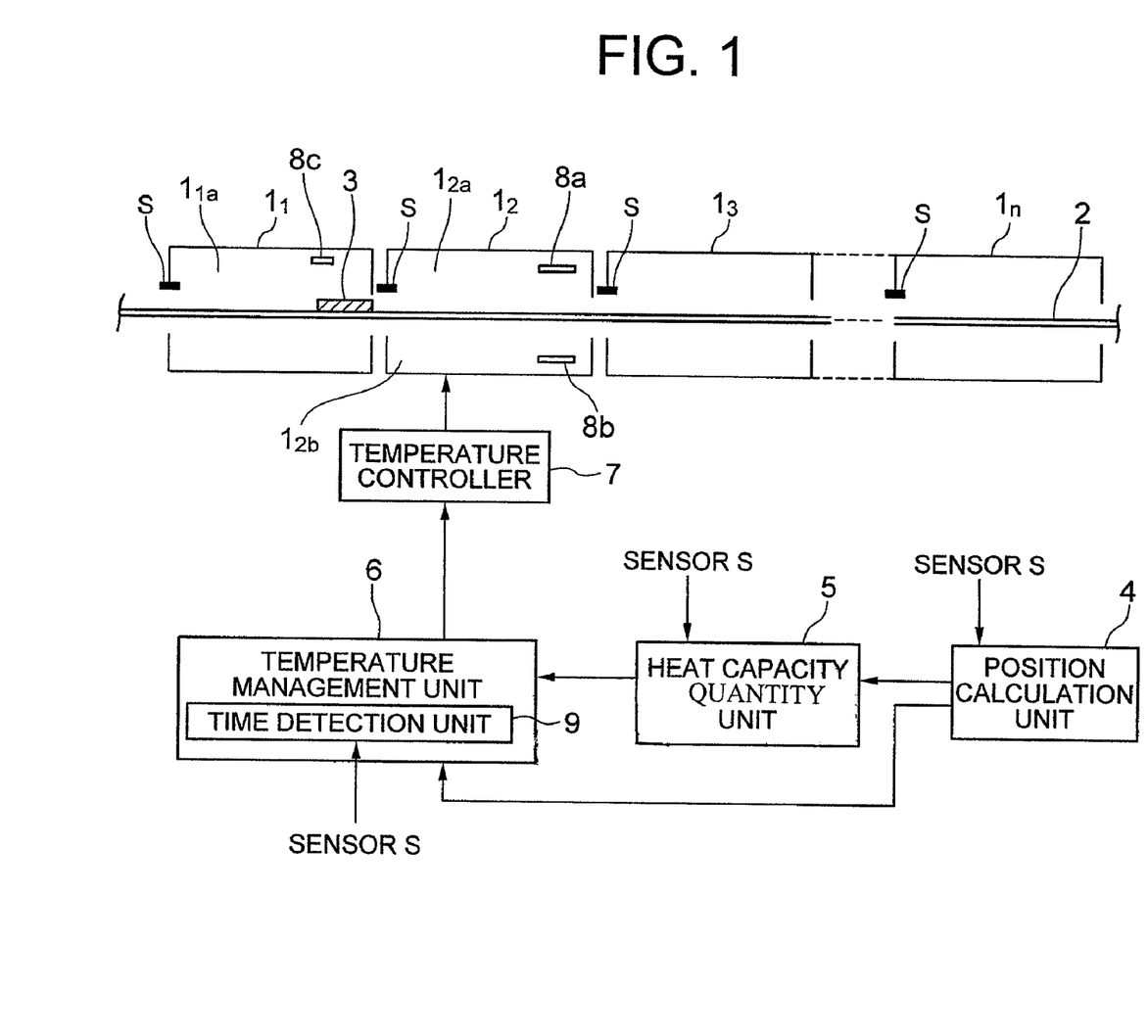
FIG. 1 is a configuration diagram showing a soldering device according to an embodiment of the present invention.

First, the difference between the present embodiment and the art disclosed in Patent Documents 1 and 2 will be clarified. As shown in FIG. 1, a soldering device includes a plurality of zones $1_1, 1_2, 1_3, \ldots 1_n$ which communicate with each other. The zones $1_1, 1_2, 1_3, \ldots 1_n$ may be configured such that they are arranged in one furnace while being partitioned from each other, or each of them is formed of an independent furnace. In the case that each of the zones $1_1, 1_2, 1_3, \ldots 1_n$ is formed of an independent furnace, it is desirable that the connecting part between adjacent furnaces is isolated from the atmosphere so that the temperature in the furnaces will not be affected by the atmospheric temperature. It should be noted that the number of zones $1_1, 1_2, 1_3, \ldots 1_n$ which communicate with each other is not limited to that shown in FIG. 1, and it may vary according to processing. Any number is acceptable if two or more zones are combined. In the following description, explanation will be given for a case of using a soldering object as a heated object 3.

The zones $1_1, 1_2, 1_3, \ldots 1_n$ which communicate with each other are provided with a conveyer 2. The conveyer 2, on which a soldering object 3 is mounted, conveys the soldering object 3 to the respective zones $1_1, 1_2, 1_3, \ldots 1_n$ sequentially. The conveyer 2 may be formed as a set of conveyers linked to each other or as separated pieces of conveyers which transfer the soldering object 3 to thereby sequentially convey the soldering object 3 to the zones $1_1, 1_2, 1_3, \ldots 1_n$. Although the conveyer 2 is formed of an endless chain, an endless belt, or the like, it is not limited to them. The conveyer 2 may be formed in any way provided that it is configured to be able to convey a soldering object 3 mounted thereon to the zones $1_1, 1_2, 1_3, \ldots 1_n$ sequentially. Further, in the zone $1_1$ into which the soldering object 3 is carried first, a sensor S for detecting carry-in of the soldering object 3 is provided at the entrance.

The sensor S has a function to measure the length direction of the soldering object 3 (length of the soldering object 3 in the carrying direction). Although the soldering object 3 is used as a heated object to be carried by the conveyer 2, the object is not limited to this. As a heated object, those other than the soldering object 3 can be used provided that they are subjected to heat processing in the zones.

In FIG. 1, it is assumed that a zone in which the internal temperature should be controlled is an object zone $1_2$, and that the soldering object 3 is carried into the object zone $1_2$ through the previous zone $1_1$ which is in the previous stage. Further, referring to FIG. 2, in a range from a time T1 to a time T3, a temperature profile P1 indicated by a solid line shows the temperature profile of a conventional example, and a temperature profile P2 indicated by a dotted line shows the temperature profile of the embodiment of the present invention.

Figure 2:
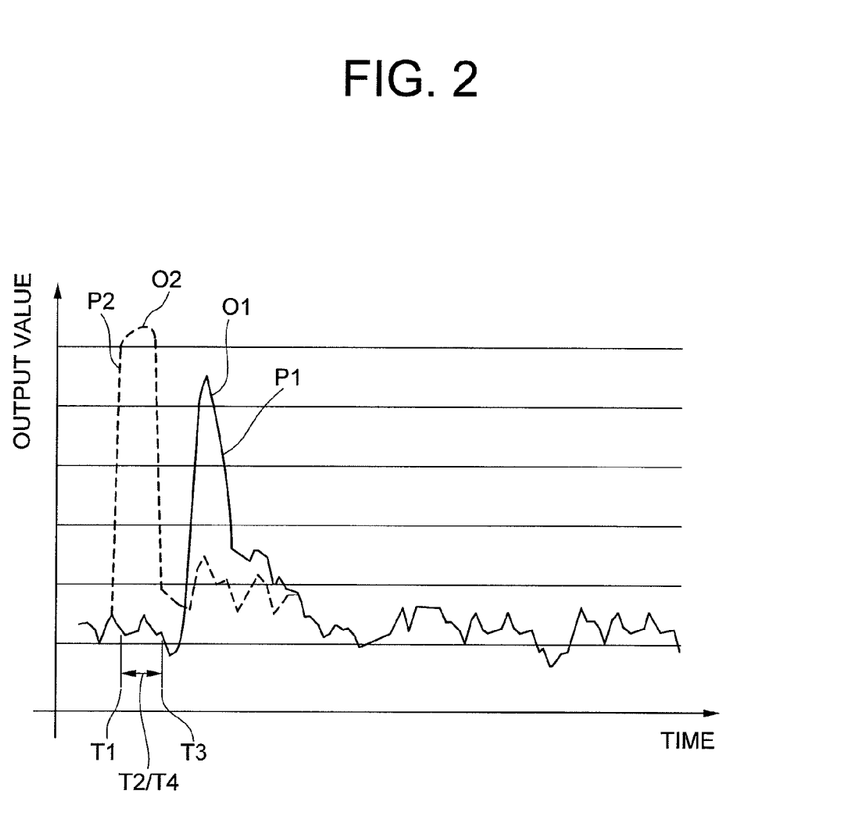
FIG. 2 is a characteristic chart showing temperature profiles of the embodiment and a conventional example.
Figure 3:
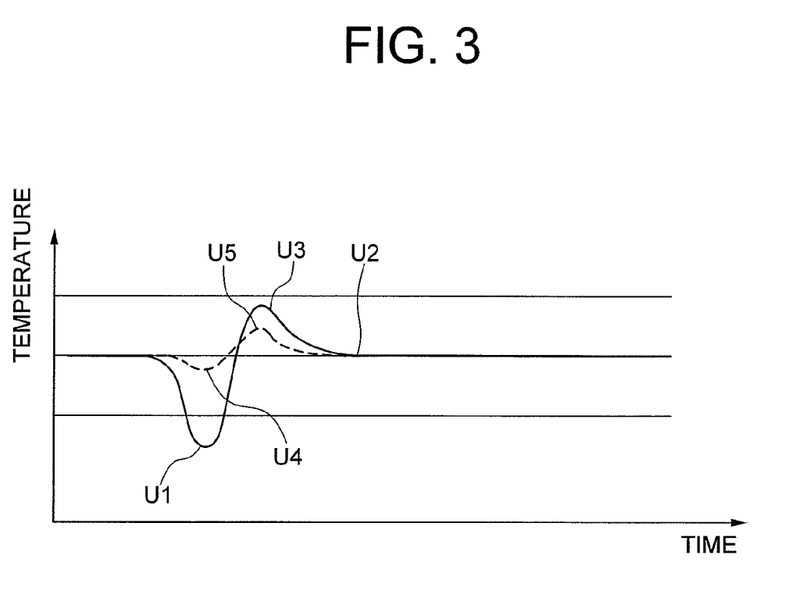
FIG. 3 is a characteristic chart showing temperature changes in an object zone of the embodiment and the conventional example.

As shown in FIGS. 2 and 3, the present embodiment and Patent Documents 1 and 2 are common in the carry-in time of the soldering object 3. That is, a time that the soldering object 3 is carried from the previous zone $1_1$ into the object zone $1_2$ is T1 in all cases. However, a time T3, which is the time that an output value is output from a temperature controller 7 such as a heater after a temperature control is started upon detection of the soldering object 3 being carried into the object zone $1_2$, is different between the present embodiment and Patent Documents 1 and 2.

As obvious from FIGS. 2 and 3, a time lag T2 exists between the time T1 when a temperature control starts and the time T3 when an output value is output from the temperature controller 7 in the temperature profile P1 of the conventional example. There is a limit in reducing the time lag T2 because some time is needed to obtain the positional information and to measure the temperature of the soldering object 3 for controlling the temperature, and further, to calculate the temperature control amount based on such information to thereby drive the heater. Furthermore, considering the responsiveness of the temperature controller 7 and other various measuring devices, the time lag T2 is inevitable. Therefore, it is needed to control the temperature in the object zone $1_2$ based on the premise that the time lag T2 exists.

In the temperature control of Patent Documents 1 and 2, an output value O1 is output from the temperature controller 7 after the time lag T2 as indicated by the temperature profile P1 shown by the solid line in FIG. 2. Therefore, during the period of time lag T2, the temperature in the object zone $1_2$ is deprived by the soldering object 3 which has been carried in, so the temperature U1 in the object zone $1_2$ rapidly drops as shown in FIG. 3. If a temperature control is performed with the rapidly dropped temperature U1 in the object zone $1_2$ being the initial temperature, a large amount of heat quantity is required to recover the rapidly dropped temperature up to a processing temperature U2. If the temperature control is performed by adding a large amount of heat quantity, the temperature in the object zone $1_2$ exceeds the processing temperature U2 and rises to an abnormal temperature U3.

Therefore, in Patent Documents 1 and 2, the range of changes between the lowest temperature U1 and the highest temperature U3 in the object zone $1_2$ becomes extremely large, so that the soldering object 3 is exposed to the atmosphere of abrupt temperature change. If a temperature change is caused abruptly in the object zone $1_2$ as described above, soldering will be affected. Further, in the case where the soldering object 3 is a component of low heat resistance, the object may be broken due to the large temperature change.

However, Patent Document 2 does not consider a drop of the temperature in the furnace due to a substrate, and timing to heat the furnace. As in the case of Patent Document 1, in the period of time lag T2, the initial temperature in the furnace at the point that a substrate is carried into the furnace is not adjusted by the heat capacity quantity of the substrate, but an output value O1 to be output from the temperature controller 7 is adjusted at a time T3 when the output value is output according to the heat quantity of the soldering object 3, in Patent Document 2.

Therefore, in Patent Document 2, since the output value O1 is output from the temperature controller 7 as shown in the temperature profile P1 indicated by the solid line in FIG. 2 after the time lag T2 as in the case of Patent Document 1, the temperature in the object zone $1_2$ is deprived by the soldering object 3 which has been carried in, so the temperature U1 in the object zone $1_2$ drops abruptly as shown by the solid line in FIG. 3 in the period of time lag T2, as in the case of Patent Document 1. Even the heat capacity of the soldering object 3 which has been calculated beforehand is referred to in Patent Document 2, a large amount of heat capacity is required for recovering the heat which is dropped abruptly up to the processing temperature U2. If the temperature control is performed by adding a large amount of heat capacity, the temperature in the object zone $1_2$ rises exceeding the processing temperature U2 up to an abnormal temperature U3, so even the heat capacity of the soldering object 3 calculated beforehand is referred to, if the initial lowest temperature to which the large amount of heat capacity is added is abnormally-low, the degree of lowering the abnormal highest temperature U3 is only slight. Therefore, the problem described above cannot be solved.

An embodiment of the present invention is characterized in that the heat capacity of the soldering object 3 is calculated, the heat capacity of the object zone $1_2$ at the time of starting the temperature control is adjusted according to the heat capacity of the soldering object 3, and an output value O2 from the temperature controller 7 according to the adjusted heat capacity is output, as shown in the temperature profile P2 indicated by the dotted line in FIG. 2.

The following description is given based on the premise that the time to start a temperature control is T1 in FIG. 2, that is, when the soldering object 3 is carried into the object zone $1_2$, the heat capacity of the object zone $1_2$ is adjusted based on the heat capacity of the soldering object 3, and then an output value O2 is output from the temperature controller 7 based on the adjusted heat capacity. It should be noted that the starting point of adjusting the heat capacity of the object zone $1_2$ based on the heat capacity of the soldering object 3 is not limited to the point of carrying the soldering object 3 into the object zone $1_2$.

Referring to FIG. 1, it is set that a zone for processing, that is, a zone in which soldering processing is performed by reflow (hereinafter referred to as an object zone), is zone $1_2$, and a zone $1_1$ which is in the previous stage of the object zone $1_2$ is a previous zone $1_1$. The soldering object 3 is mounted on the conveyer 2 and is carried into the object zone $1_2$ while passing through the previous zone $1_1$.

As shown in FIG. 1, the soldering device of the present embodiment includes a position calculation unit 4, a heat capacity calculation unit 5, and a temperature management unit 6.

The position calculation unit 4 calculates the position of the soldering object 3 according to the operational information of the conveyer 2 which sequentially conveys the soldering object 3 into a plurality of zones $1_1, 1_2, 1_3, \ldots 1_n$ for processing communicated with each other. As described in Patent Document 3, the position calculation unit 4 counts the number of pulses output from the pulse counter in synchronization with the operating amount of the conveyer to thereby measure the position of the soldering object 3 in the zone $1_1, 1_2, 1_3, \ldots 1_n$. It should be noted that the position measurement unit 4 may calculate the position of the soldering object 3 using a method other than that described in Patent Document 3, that is, with a position sensor provided to each zone for example.

The heat capacity calculation unit 5 calculates the heat capacity of the soldering object 3 to be carried into a zone. More specifically, the heat capacity calculation unit 5 calculates the heat capacity of the soldering object 3 based on the product of a difference between the temperature of the object zone $1_2$ to which the soldering object 3 is conveyed and the temperature of the previous zone $1_1$ positioned in the previous stage of the object zone $1_2$, and the width dimensional ratio ($L/L_{max}$) of the soldering object 3, and a coefficient serving as a threshold for adjusting the heat capacity of the object zone $1_2$.

Hereinafter, description will be given specifically using formulas, in which each of the previous zone $1_1$ and the object zone $1_2$ is divided into the upper part and the lower part with reference to the conveyer 2, and temperature set values of the respective parts are set such that the value in the upper part $1_{2a}$ of the subject zone $1_2$ is X, the value in the upper part $1_{1a}$ of the previous zone $1_1$ is X', and the value in the lower part $1_{2b}$ of the object zone $1_2$ is X".

Figure 4:
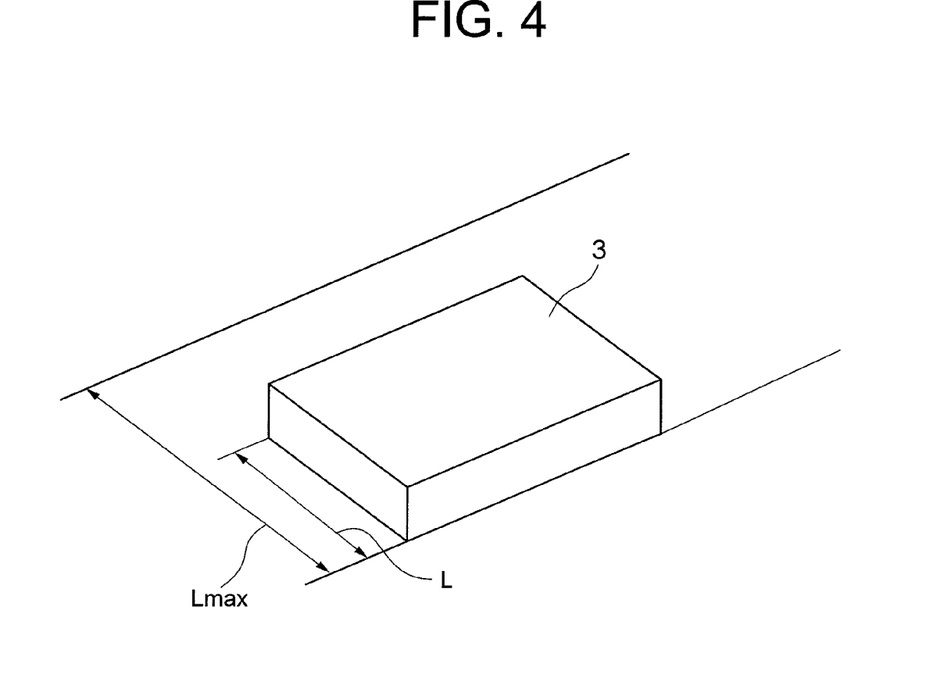
FIG. 4 is a perspective view schematically showing a state of calculating the carry-in amount of a soldering object.

As shown in FIG. 4, the heat capacity calculation unit 5 calculates the width ratio between the maximum width $L_{max}$ of the conveyer 2, which is stored in the heat capacity calculation unit 5, and the width L of the soldering object 3 conveyed by the conveyer 2 at the time of calculating the heat capacity, using a formula (1). The width ratio between the width $L_{max}$ and the width L shows the ratio of the soldering object 3 to the object zone $1_1$.

$$L/L_{max} \tag{1}$$

In FIG. 4, if the maximum width $L_{max}$ of the conveyer 2 and the width L of the soldering object 3 are equal, that is, if the width of the conveyer 2 is fixed, the width ratio $L/L_{max}$ of the soldering object 3 to the maximum width $L_{max}$ is "1". If the width of the conveyer 2 is adjustable corresponding to the width of the soldering object 3, the width ratio of the soldering object 3 to the maximum width $L_{max}$ is indicated as $L/L_{max}$. Although the width ratio of the soldering object 3 is set with respect to the width of the conveyer 2 in the above description, this is not always the case. The width ratio of the soldering object 3 may be set with respect to the width of the carry-in entrance from which the object zone $1_2$ receives the soldering object 3, rather than the width of the conveyer 2. In such a case, if the maximum width $L_{max}$ of the carry-in entrance of the object zone $1_2$ and the width L of the soldering object 3 are equal, that is, if the width of the carry-in entrance of the object zone $1_2$ is fixed, the width ratio $L/L_{max}$ of the soldering object 3 to the maximum width $L_{max}$ is "1". If the width of the carry-in entrance of the object zone $1_2$ is adjustable corresponding to the width of the soldering object 3, the width ratio of the soldering object 3 to the maximum width $L_{max}$ is indicated as $L/L_{max}$. It should be noted that the description below is given for the case where the width ratio of the soldering object 3 is indicated with reference to the width of the carry-in entrance of the object zone $1_2$ (hereinafter referred to as the width of the object zone $1_2$).

The heat capacity calculation unit 5 calculates the temperature difference between the previous zone $1_1$ and the object zone $1_2$ as a positive deviation. If the temperature set value X of the upper part $1_{2a}$ of the object zone $1_2$ is equal to or larger than the temperature set value X' of the upper part $1_{1a}$ of the previous zone $1_1$, that is, if X≧X', the heat capacity calculation unit 5 calculates as follows:

$$\text{Temperature difference } A = X - X' \quad (2)$$

If the temperature set value X of the upper part $1_{2a}$ of the object zone $1_2$ is smaller than the temperature set value X' of the upper part $1_{1a}$ of the previous zone $1_1$, that is, if X<X', the heat capacity calculation unit 5 sets as follows:

$$\text{Temperature difference } A = 0 \quad (3)$$

Next, the heating capacity calculation unit 5 calculates the temperature difference between the temperature set value X of the upper part $1_{2a}$ of the object zone $1_2$ and the temperature set value X'' of the lower part $1_{2b}$ of the object zone $1_2$ as a positive deviation. If the temperature set value X of the upper part $1_{2a}$ of the object zone $1_2$ is equal to or larger than the temperature set value X'' of the lower part $1_b$ of the previous zone $1_1$ which is positioned before the object zone $1_2$, that is, if X≧X'', the heat capacity calculation unit 5 calculates as follows:

$$\text{Temperature difference } A = X - X'' \quad (4)$$

Next, the heat capacity calculation unit 5 calculates a coefficient B which serves as a threshold to adjust the heat capacity of the object zone $1_2$. In calculating the coefficient B, if the difference between the temperature set value X of the upper part $1_{2a}$ of the object zone $1_2$ and the temperature set value X'' of the lower part $1_{1b}$ of the previous zone $1_1$ (temperature difference A'=X-X'') is 30° C. or more, the temperature difference A' is disregarded. It should be noted that the reference value of 30° C. is just an example, so it may be changed appropriately according to the type of the soldering object 3.

More specifically, if the temperature difference A' is larger than -30° C. and smaller than 30° C., that is, if |A'|<30, heat capacity calculation unit 5 calculates as follows:

$$\text{Coefficient } B = (A' + 30)/60 \quad (5)$$

If the temperature difference A' is larger than or equal to 30° C., that is, if A'≧30, the heat capacity calculation unit 5 sets as follows:

$$\text{Coefficient } B = 1.0 \quad (6)$$

If the temperature difference A' is smaller than or equal to -30° C., that is, if A'≦-30, the heat capacity calculation unit 5 sets as follows:

$$\text{Coefficient } B = 0 \quad (7)$$

The heat capacity calculation unit 5 calculates the heat capacity of the soldering object 3 corresponding to a formula (8) which is the product of the temperature difference A between the object zone $1_2$ into which the soldering object 3 is carried and the previous zone $1_1$ which is positioned before the object zone $1_2$, the width ratio ($L/L_{max}$) of the soldering object 3 to the width of the object zone $1_2$, and the coefficient B to be used as a threshold for adjusting the heat capacity of the object zone $1_2$.

$$\text{Heat capacity } MV' \text{ of soldering object } 3 = A * B * (L/L_{max}) \quad (8)$$

The temperature management unit 6 adjusts the heat capacity of the object zone $1_2$ according to the heat capacity of the soldering object 3 to be calculated by the heat capacity calculation unit 5 to thereby control the temperature of the object zone $1_2$. Further, the temperature management unit 6 also has a time detection unit 9 which detects a period from the time that T4 has passed in the temperature profile P2 indicated by the dotted line in FIG. 2, that is, the time that the tip of the soldering object 3 being carried into the furnace is detected from a detection signal of the sensor S, to the time that the back end of the soldering object 3 is detected.

Next, the function of the temperature management unit 6 will be described in detail using FIG. 2. When the position calculation unit 4 calculates that the soldering object 3 is carried into the object zone $1_2$ according to the positional information, the temperature management unit 6 causes the temperature controller 7 to make an output at the point around the temperature control starting position T1 within the object zone $1_2$ in the temperature profile P2 indicated by the dotted line in FIG. 2, that is, when the soldering object 3 is carried into the object zone $1_2$, with the output value (formula (9)) O2 being the target value to thereby control the temperature of the object zone $1_2$. The output value O2 is obtained such that the output amount MV calculated corresponding to the width L of the of the object zone $1_2$ and the heat capacity MV' of the soldering object 3 calculated by the heat capacity calculation unit 5 are added. In controlling the temperature of the object zone $1_2$, since there is a time T2, the time of outputting the output value O2 from the temperature controller 7 may be set immediately before the point T1 of starting temperature control of the subject zone $1_2$. Namely, the time at which the output value O2 is output from the temperature controller 7 can be set at any point where the soldering object 3 is carried into the object zone $1_2$, including immediately before the time T1 of starting the temperature control of the object zone $1_2$.

$$\text{Output value} = MV + MV' \quad (9)$$

The temperature management unit 6 controls the temperature of the object zone $1_2$ with the output value shown in a formula (10) when the time T4 has passed in the temperature profile P2 shown by the dotted line in FIG. 2, by not adding the heat capacity MV' of the soldering object 3 calculated by the heat capacity calculation unit 5 to the output amount MV. When the soldering object 3 is carried into the object zone $1_2$, the soldering object 3 deprives and holds the heat in the object zone $1_2$. Therefore, when the period of time T2 has passed, an effect on the temperature change in the object zone $1_2$ is reduced even though the heat capacity MV' of the soldering object 3 is not added.

$$\text{Output value} = MV \quad (10)$$

Although the soldering device is constructed as hardware in the above-described embodiment, the present invention is not limited to this form. The present invention may be constructed as software which is a program for soldering. In an embodiment as a program for soldering, the present invention is constructed to have a configuration which causes a computer provided to a soldering device to perform: a function of calculating the position of a soldering object according to the operational information of a conveyer which sequentially conveys the soldering object into a plurality of zones for performing continuous processing (position calculation unit); a function of calculating the heat capacity of the soldering object (heat capacity calculation unit); and corresponding to the calculated positional information of the soldering object, a function of adjusting the heat capacity of the object zone based on the calculated heat capacity of the soldering object to thereby control the temperature in the object zone (temperature management unit).

Next, the case of performing a soldering method using a soldering object according to the embodiment will be described based on FIGS. 2, 3, 5 and 6.

Figure 5:
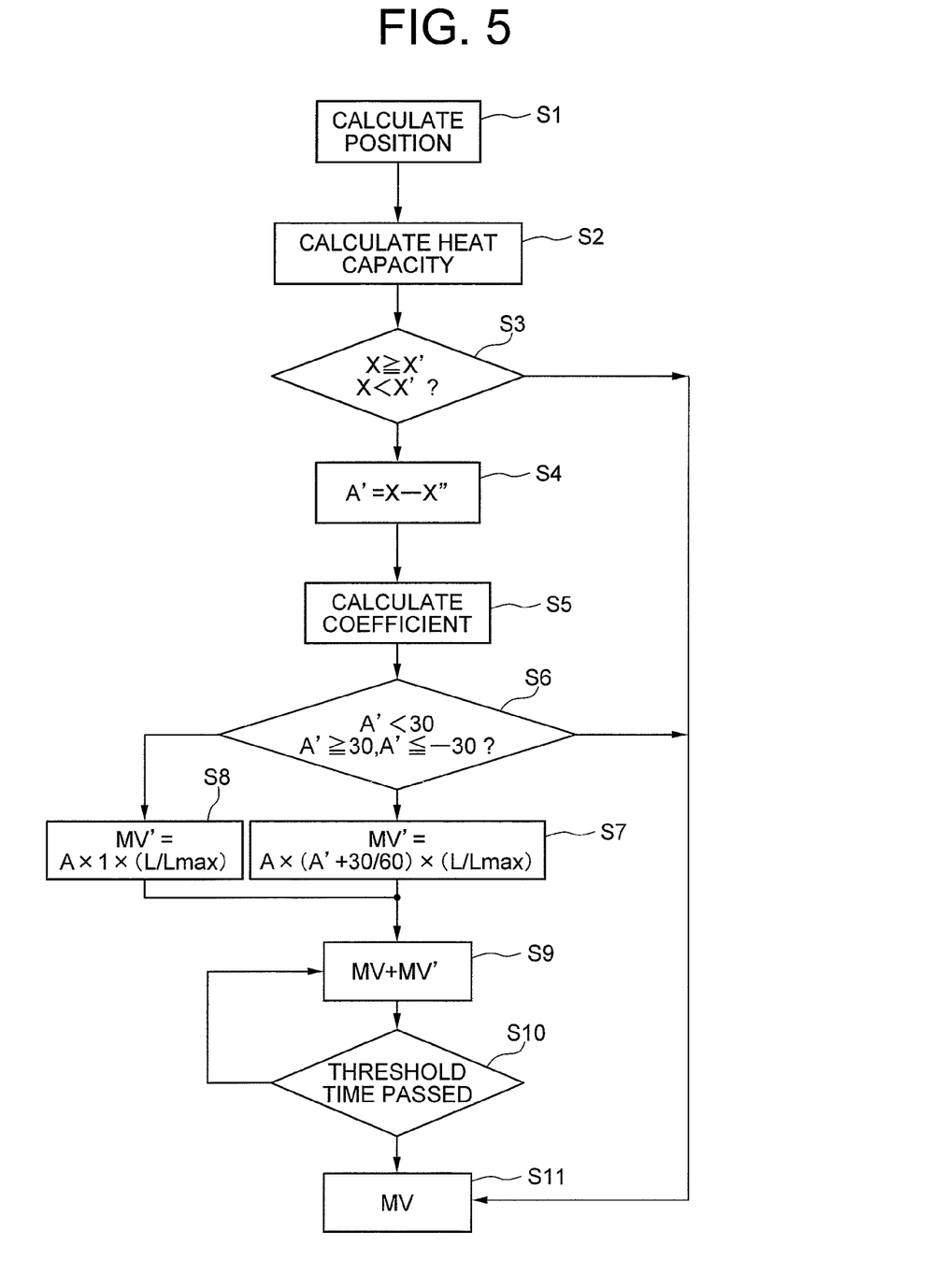
FIG. 5 is a flowchart illustrating a soldering method of the embodiment.

The position of the soldering object 3 passing through the previous zone $1_1$ located in the previous stage of the object zone $1_2$ is calculated by the position calculation unit 4 (step S1 in FIG. 5). When the heat capacity calculation unit 5 receives from the position calculation unit 4 positional information indicating that the soldering object 3 arrives at a position immediately before being carried into the object zone $1_2$ from the previous zone $1_1$, or at a point where the soldering object 3 carried into the object zone $1_2$, the heat capacity calculation unit 5 calculates the heat capacity of the soldering object 3 based on the product (formula (9)) of the temperature difference A between the object zone $1_2$ into which the soldering object 3 is carried and the previous zone $1_1$, the width ratio of the soldering object 3 ($L/L_{max}$), and the coefficient B serving as a threshold for adjusting the heat capacitance of the object zone $1_2$ (step S2 in FIG. 5).

More specifically, first, the heat capacity calculation unit 5 determines whether the temperature set value X of the upper part $1_{2a}$ of the object zone $1_2$ is larger than or equal to the temperature set value X' of the upper part $1_{1a}$ of the previous zone $1_1$, that is, $X \geq X'$, or whether the temperature set value X of the upper part $1_{2a}$ of the object zone $1_2$ is smaller than the temperature set value X' of the upper part $1_{1a}$ of the previous zone $1_1$, that is, $X<X'$ (step S3 in FIG. 5).

If the temperature set value X of the upper part $1_{2a}$ of the object zone $1_2$ is larger than or equal to the temperature set value X' of the upper part $1_{1a}$ of the previous zone $1_1$, that is, $X \geq X'$, the heat capacity calculation unit 5 calculates the temperature difference $A=X-X'$, as represented by the formula (2) (step S3 in FIG. 5).

In contrast, if the temperature set value X of the upper part $1_{2a}$ of the object zone $1_2$ is smaller than the temperature set value X' of the upper part $1_{1a}$ of the previous zone $1_1$, that is, $X<X'$, the heat capacity calculation unit 5 applies the temperature difference $A=0$, as represented by the formula (3) (step S3 in FIG. 5).

Then, if the temperature set value X of the upper part $1_{2a}$ of the object zone $1_2$ is larger than or equal to the temperature set value X" of the lower part $1_{2b}$ of the object zone $1_2$, that is, $X \geq X"$, the heat capacity calculation unit 5 calculates the temperature difference $A'=X-X"$, as represented by the formula (4) (step S4 in FIG. 5).

Next, the heat capacity calculation unit 5 calculates the coefficient B which serves as a threshold for adjusting the heat capacity of the object zone $1_2$ (step S5 in FIG. 5).

If the temperature difference A' is smaller than 30, that is, $|A'|<30$, the heat capacity calculation unit 5 calculates the coefficient $B=(A'+30)/60$, as represented by the formula (5). Then, the heat capacity calculation unit 5 calculates the heat capacity of the soldering object 3 based on the product (formula (8)) of the coefficient $B=(A'+30)/60$, the temperature difference A, and the width ratio of the soldering object 3 to the width of the object zone $1_1$ ($L/L_{max}$) (step S7 in FIG. 5).

If the temperature difference A' is equal to or larger than 30, that is, $A' \geq 30$, the heat capacity calculation unit 5 set the coefficient $B=1.0$ in the formula (6). Then, the heat capacity calculation unit 5 calculates the heat capacity corresponding to the width ratio of the soldering object 3 to the width of the object zone $1_2$ ($L/L_{max}$) based on the product (formula (8)) of the coefficient $B=1$, the temperature difference A, and the width ratio of the soldering object 3 to the width of the object zone $1_2$ (step S8 in FIG. 5).

If the temperature difference A' is equal to or smaller than $-30$, that is, if $A' \leq -30$, the heat capacity calculation unit 5 sets the coefficient $B=0$ in the formula (7).

When the heat management unit 6 receives the heat capacity of the soldering object 3 calculated by the heat capacity calculation unit 5 in the steps S7 and S8 in FIG. 5 and the positional information of the soldering object 3 from the position calculation unit 4, the heat management unit 6 feedforward-controls the temperature in the object zone $1_2$. In the following description, the case where the temperature management unit 6 performs P control (proportional control) of PID (Proportional Integral Derivative) control to thereby feedforward-control the temperature in the object zone $1_2$ will be described.

The temperature management unit 6 controls the temperature in the object zone $1_2$ in such a manner that the heat capacity to be supplied to the object zone $1_2$ is set to be an input value, the heat capacity inside the object zone $1_2$ which is controlled based on the input value is set to be an output value, a heat capacity calculated by adding the heat capacity which is calculated by the heat capacity calculation unit 5 to the heat capacity of the object zone $1_2$ is set to be a target value, and the input value is controlled as a linear function of the deviation between the output value and the target value. Hereinafter, specific description will be given.

When the heat management unit 6 detects that the soldering object 3 is carried into the object zone $1_2$ according to the positional information calculated by the position calculation unit 4, the heat management unit 6 sets the output value (formula (9)) O2, in which the heat capacity MV' of the soldering object 3 calculated by the heat capacity calculation unit 5 is added to the output amount MV calculated corresponding to the width ratio ($L/L_{max}$) of the soldering object 3 to the width of the object zone $1_2$, to be the target value of the P control, at the point near the starting point T1 of the feedforward control of the object zone $1_2$ in the temperature profile P2 shown by the dotted line in FIG. 2, that is, when the soldering object 3 is carried into the object zone $1_2$.

Figure 6A:
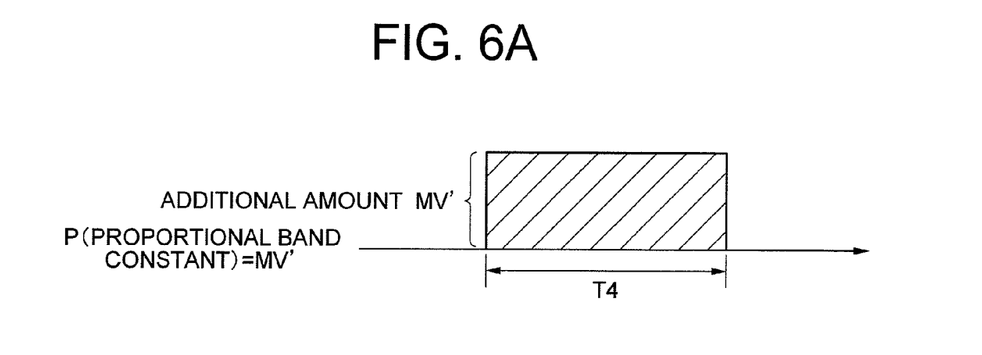
FIGS. 6A, 6B and 6C illustrate a feedforward control in the embodiment of the present invention.

Next, as shown in FIG. 6A, the temperature management unit 6 controls the heat capacity as an input value to be supplied to the object zone $1_2$ as a linear function of the deviation between the heat capacity of the object zone $1_2$ as an output value and a heat capacity value which is the target value, according to the detection signals outputted from the temperature sensors 8a, 8b and 8c, to thereby control (feedforward-control) the temperature in the object zone $1_2$ (step S9 in FIG. 5). As shown in FIG. 6A, P (proportional band coefficient) is set to be the output value MV'.

$$\text{Output value} = MV + MV' \qquad (9)$$

When the temperature management unit 6 recognizes the point that the time T4 in the profile P2 shown by the dotted line in FIG. 2 has passed (the point that the unit 6 recognizes that the threshold time has passed) according to the output value from the time detection unit 9 (step S10 in FIG. 5), the temperature management unit 6 feedback-controls the temperature in the object zone $1_2$ with the output value shown by the formula 10, while not adding the heat capacity MV' of the soldering object 3 calculated by the heat capacity calculation unit 5 to the output amount MV, to thereby make the temperature in the object zone $1_2$ stable at the processing temperature U2 which is optimum for soldering as shown in FIG. 3 (step S11 in FIG. 5).

$$\text{Output value} = MV \qquad (10)$$

According to the present embodiment, since the temperature is controlled such that the heat capacity of the soldering object carried into the object zone is added to the initial temperature in the temperature control inside the object zone, the temperature of the object zone can be more stable.

According to the present embodiment, since the temperature control is started while the temperature in which the heat capacity calculated by the heat capacity calculation unit is added to the heat capacity of the object zone before the soldering object is carried in is set as the initial temperature when the temperature in the object zone is controlled, the range of changes between the lowest temperature U4 and the highest temperature U5 inside the object zone can be suppressed to be extremely small as shown by the dotted line in FIG. 3.

According to the present embodiment, the range of changes between the lowest temperature U4 and the highest temperature U5 inside the object zone can be suppressed to be extremely small as shown by the dotted line in FIG. 3, so the soldering object 3 can be prevented from being exposed to an atmosphere in which the temperature is changed abruptly. Therefore, in addition to an advantage that soldering can be performed in a good environment, a soldering object can be protected from breakage due to temperature changes even if the soldering object is a component of low heat resistance.

According to the present embodiment, since the temperature control is started such that the temperature in which the heat capacity calculated by the heat capacity calculation unit is added to the heat capacity of the object zone before the soldering object is carried in is set as the initial temperature when the temperature in the object zone is controlled, the degree that the lowest temperature U4 drops with respect to the processing temperature U2 inside the object zone is extremely small as indicated by the dotted line in FIG. 3, so an overshoot phenomenon caused when the temperature of the object zone is controlled can be suppressed within a short time as shown by the dotted line in FIG. 3. Therefore, overload placed on the soldering object can be prevented.

According to the present embodiment, since the temperature control is started such that the temperature in which the heat capacity calculated by the heat capacity calculation unit is added to the heat capacity of the object zone before the soldering object is carried in is set as the initial temperature when the temperature in the object zone is controlled, the stability of the temperature in the object zone can be improved regardless of the capacity of the soldering object. Therefore, the temperature in the object zone can be stable with respect to the soldering object having large heat capacity.

According to the present embodiment, since the heat capacity of the soldering object is calculated based on the product of the temperature difference between the object zone into which the soldering object is carried and the previous zone which is in the previous stage of the object zone, the carried-in amount of the soldering object, and the coefficient serving as the threshold for adjusting the heat capacity of the object zone, the heat capacity of the soldering object which is carried into the object zone can be calculated accurately.

Although the present embodiment have described the case that the temperature management unit 6 controls the temperature in the object zone $1_2$ such that the heat capacity to be supplied to the object zone $1_2$ is set to be an input value, the heat capacity inside the object zone $1_2$ controlled according to the input value is set to be an output value, a heat capacity in which the heat capacity calculated by the heat capacity calculation unit 5 is added to the heat capacity of the object zone $1_2$ is set to be a target value, and the input value is controlled as a linear function of the deviation between the output value and the target value (MV+MV'), that is, a so-called P control is performed, as shown in FIG. 6A, the present invention is not limited to this embodiment.

Figure 6B:
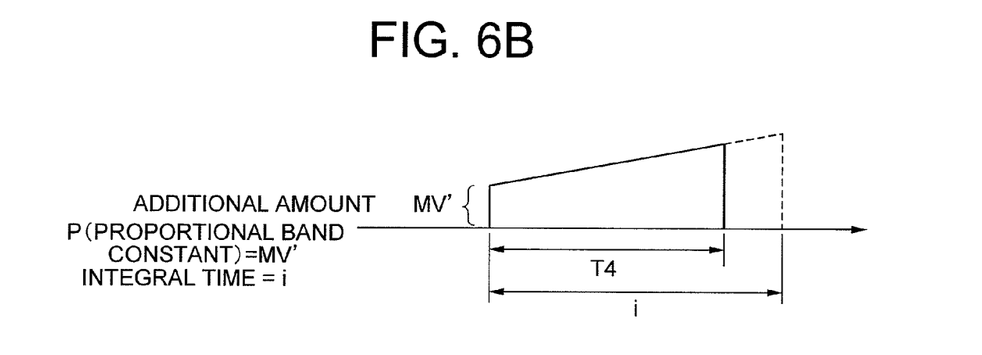

In addition to the P control (control with a linear function) as shown in FIG. 6A, the temperature management unit 6 may control the temperature in the object zone $1_2$ with a control to change the input value by integral action in proportion to the integral of the deviation between the target value and the output value, that is, may perform PI control, as shown in FIG. 6B, to thereby feedback-control the temperature in the object zone $1_2$. In the case of the PI control as shown in FIG. 6B, although it is the same as the present embodiment that the heat capacity in which the heat capacity calculated by the heat capacity calculation unit 5 is added to the heat capacity of the object zone $1_2$ is set to be a target value of the feedforward control, temperature control is performed up to the heat capacity (MV+MV') of the target value together with a control in which the output value at the time of starting the feedback control is set to be ½ of the target value and the input value is changed by integral action in proportion to the integral of the deviation between the target value and the output value. In FIG. 6B, the integral time is set to "i".

Figure 6C:
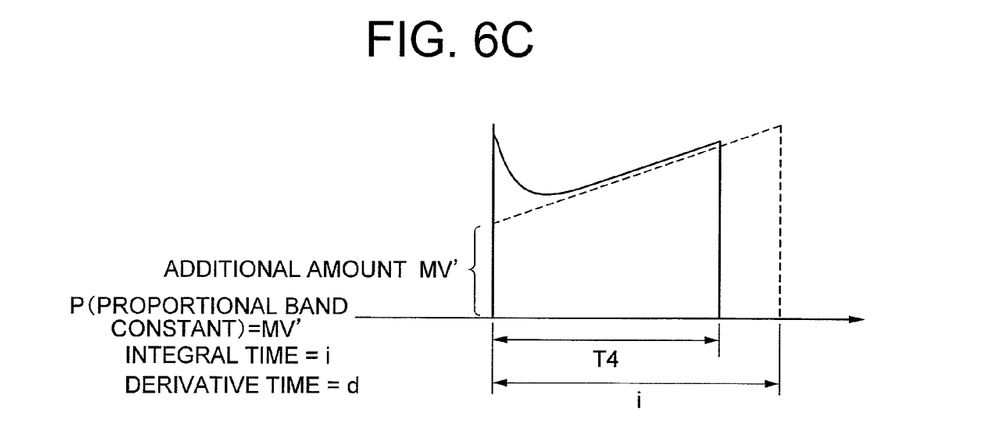

Alternatively, in addition to the control with a linear function (P control) as shown in FIG. 6B and the control with the integral action (I control), the temperature management unit 6 may control the temperature in the object zone by using a control to change the input value with a derivative action in proportion to the derivative of the deviation between the target value and the output value (PID control) as shown in FIG. 6C. In the PID control, the input value precipitously rises by the derivative action in the derivative time d, and gradually changes with a curve as time passes, as shown in FIG. 6C.

In the case that the zone $1_1$ is an object zone, the heat capacity calculation unit 5 may assume that a virtual zone is provided before the object zone $1_1$, and set the temperature of the virtual zone to be 30° C. or to be the outside temperature of the heating device (25° C. at normal temperature and normal pressures) to thereby calculate the heat capacity of the soldering object 3. Although the threshold of the temperature difference is set to 30° C. or −30° C. when the heat capacity calculation unit 5 calculates the capacity of the heated object 3, the temperature is not limited to these values, and may change variously according to the capacity of the assumed heated object 3.

INDUSTRIAL APPLICABILITY

According to the present invention, soldering can be performed in a state where the temperature in an object zone is stable, regardless of the heat capacity of a soldering object.

What is claimed is:
1. A soldering device, comprising:
a position calculation unit which calculates a position of a heated object according to operational information of a conveyer which sequentially transfers the heated object into a plurality of zones for heat processing communicated with each other;
a heat quantity calculation unit that calculates a temperature difference A between temperature set values when a temperature set value of an upper part of an object zone into which the heater objected is carried is equal to or larger than a temperature set value of an upper part of a previous zone located in a previous stage of the object zone,
calculates a temperature difference A' between the temperature set values when the temperature set value of the upper part of the object zone is equal to or larger than the temperature set value of a lower part in a furnace of the previous zone,
calculates a coefficient serving as a threshold for adjusting a heat quantity in the object zone based on a relation between an absolute value of the temperature difference A' and a reference temperature, and
calculates a heat quantity of the heated object based on a product of the temperature difference A, the coefficient, and a width ratio defined by a width of the heated object relative to the object zone; and
a temperature management unit which controls a temperature in an object zone, into which the heated object is carried, by adding the heat quantity of the heat object calculated by the heat quantity calculation unit to the heat quantity of the object zone calculated corresponding to a width of the object zone.

2. The soldering device according to claim 1, wherein the temperature management unit controls the temperature in the object zone in such a manner that a heat quantity to be supplied to the object zone is set to be an input value, a heat quantity of the object zone controlled based on the input value is set to be an output value, a heat quantity in which the heat quantity calculated by the heat quantity calculation unit is added to the heat quantity of the object zone is set to be a target value, and the input value is controlled as a linear function of a deviation between the output value and the target value.

3. The soldering device according to claim 2, wherein in addition to a control with the linear function, the temperature management unit controls the temperature in the object zone with a control to change the input value by an integral action in proportion to an integral of the deviation between the target value and the output value.

4. The soldering device according to claim 3, wherein in addition to the control with the linear function and the control by the integral action, the temperature management unit controls the temperature in the object zone with a control to change the input value by a derivative action in proportion to the deviation between the target value and the output value.

5. A soldering method, comprising:
calculating a position of a heated object according to operational information of a conveyer which sequentially transfers the heated object into a plurality of zones for heat processing communicated with each other;
calculating a temperature difference A between temperature set values when a temperature set value of an upper part of an object zone into which the heater objected is carried is equal to or larger than a temperature set value of an upper part of a previous zone located in a previous stage of the object zone,
calculating a temperature difference A' between the temperature set values when the temperature set value of the upper part of the object zone is equal to or larger than the temperature set value of a lower part in a furnace of the previous zone,
calculating a coefficient serving as a threshold for adjusting a heat quantity in the object zone based on a relation between an absolute value of the temperature difference A' and a reference temperature, and
calculating a heat quantity of the heated object based on a product of the temperature difference A, the coefficient, and a width ratio defined by a width of the heated object relative to the object zone; and
controlling the temperature in the object zone, into which the heated object is carried, by adding the heat quantity of the heat object calculated by the heat quantity calculation unit to the heat quantity of the object zone calculated corresponding to a width of the object zone.

6. The soldering method according to claim 5, wherein the temperature in the object zone is controlled in such a manner that a heat quantity to be supplied to the object zone is set to be an input value, a heat quantity of the object zone controlled based on the input value is set to be an output value, a heat quantity in which the heat quantity calculated by the heat quantity calculation unit is added to the heat quantity of the object zone is set to be a target value, and the input value is controlled as a linear function of a deviation between the output value and the target value.

7. The soldering method according to claim 5, wherein in addition to a control with the linear function, the temperature in the object zone is controlled with a control to change the input value by an integral action in proportion to an integral of the deviation between the target value and the output value.

8. The soldering method according to claim 7, wherein in addition to a control with the linear function and a control by the integral action, the temperature in the object zone is controlled with a control to change the input value by a derivative action in proportion to the derivative of the deviation between the target value and the output value.

9. A computer readable recording medium, comprising:
a function of calculating a position of a heated object according to operational information of a conveyer which sequentially transfers the heated object into a plurality of zones for heat processing communicated with each other;
a function of calculating a temperature difference A between temperature set values when a temperature set value of an upper part of an object zone into which the heater objected is carried is equal to or larger than a temperature set value of an upper part of a previous zone located in a previous stage of the object zone,
calculating a temperature difference A' between the temperature set values when the temperature set value of the upper part of the object zone is equal to or larger than the temperature set value of a lower part in a furnace of the previous zone,
calculating a coefficient serving as a threshold for adjusting a heat quantity in the object zone based on a relation between an absolute value of the temperature difference A' and a reference temperature, and
calculating a heat quantity of the heated object based on a product of the temperature difference A, the coefficient, and a width ratio defined by a width of the heated object relative to the object zone; and
a function of controlling controlling the temperature in the object zone, into which the heated object is carried, by adding the heat quantity of the heat object calculated by the heat quantity calculation unit to the heat quantity of the object zone calculated corresponding to a width of the object zone.

10. The program for soldering according to claim 9, which causes the computer to perform a function of controlling the temperature in the object zone in such a manner that a heat quantity to be supplied to the object zone is set to be an input value, a heat quantity of the object zone controlled based on the input value is set to be an output value, a heat quantity in which the heat quantity calculated by the heat quantity calculation unit is added to the heat quantity of the object zone is set to be a target value, and the input value is controlled as a linear function of a deviation between the output value and the target value.

11. The computer readable medium according to claim 9, further comprising, in addition to a control with the linear function, a function of controlling the temperature in the object zone with a control to change the input value by an integral action in proportion to an integral of the deviation between the target value and the output value.

12. The computer readable medium according to claim 9, further comprising, in addition to a control with the linear function and a control by the integral action, a function of controlling the temperature in the object zone with a control to change the input value by a derivative action in proportion to a derivative of the deviation between the target value and the output value.

* * * * *

UNITED STATES PATENT AND TRADEMARK OFFICE
CERTIFICATE OF CORRECTION

| | |
|---|---|
| PATENT NO. | : 7,809,465 B2 |
| APPLICATION NO. | : 11/950106 |
| DATED | : October 5, 2010 |
| INVENTOR(S) | : T. Yamaguchi et al. |

It is certified that error appears in the above-identified patent and that said Letters Patent is hereby corrected as shown below:

On the Title page 2, Item (56) Foreign Patent Documents, line 9 of the printed patent, "1990" should be --2000--.

At column 14, line 35 (claim 9, line 26) of the printed patent, delete "controlling" before --the--.

Signed and Sealed this
Tenth Day of May, 2011

David J. Kappos
*Director of the United States Patent and Trademark Office*